(12) United States Patent
Reyes et al.

(10) Patent No.: US 12,118,118 B2
(45) Date of Patent: Oct. 15, 2024

(54) STORING LEGAL HOLD DATA IN CLOUD DATA STORAGE UNITS

(71) Applicant: Kyndryl, Inc., New York, NY (US)

(72) Inventors: Joseph Reyes, Pelham, NY (US); Andrew S. Kronstadt, Pensacola, FL (US); Christopher C. Bode, Cary, NC (US)

(73) Assignee: Kyndryl, Inc., New York, NY (US)

( * ) Notice: Subject to any disclaimer, the term of this patent is extended or adjusted under 35 U.S.C. 154(b) by 310 days.

(21) Appl. No.: 17/023,590

(22) Filed: Sep. 17, 2020

(65) Prior Publication Data

US 2022/0083685 A1 Mar. 17, 2022

(51) Int. Cl.
| | | |
|---|---|---|
| *G06F 21/62* | (2013.01) | |
| *G06F 11/14* | (2006.01) | |
| *G06F 21/60* | (2013.01) | |
| *G06Q 50/18* | (2012.01) | |
| *H04L 67/568* | (2022.01) | |

(52) U.S. Cl.
CPC ...... *G06F 21/6245* (2013.01); *G06F 11/1451* (2013.01); *G06F 11/1464* (2013.01); *G06F 11/1469* (2013.01); *G06F 21/602* (2013.01); *G06F 21/604* (2013.01); *G06Q 50/18* (2013.01); *H04L 67/568* (2022.05); *G06Q 2220/00* (2013.01)

(58) Field of Classification Search
CPC ............ G06F 21/6245; G06F 11/1451; G06F 11/1464; G06F 11/1469; G06F 21/602; G06F 21/604; H04L 67/568; G06Q 50/18; G06Q 2220/00

USPC .......................................................... 707/653
See application file for complete search history.

(56) References Cited

U.S. PATENT DOCUMENTS

| | | | | |
|---|---|---|---|---|
| 8,972,354 | B1* | 3/2015 | Telang | .................... G06Q 10/10 |
| | | | | 707/661 |
| 9,052,939 | B2 | 6/2015 | Ferris | |
| 10,191,907 | B2 | 1/2019 | Greetham | |
| 10,853,406 | B2* | 12/2020 | Mitkar | ............... G06F 16/5838 |
| 2013/0297662 | A1* | 11/2013 | Sharma | ................. H04W 12/08 |
| | | | | 707/827 |
| 2014/0012767 | A1 | 1/2014 | Schmidt | |
| 2015/0006957 | A1* | 1/2015 | Ginzinger | ............... G06F 3/067 |
| | | | | 707/812 |
| 2017/0005803 | A1 | 1/2017 | Brownewell | |
| 2019/0034295 | A1* | 1/2019 | Bourgeois | ............. G06F 16/125 |
| 2019/0138496 | A1 | 5/2019 | Yamaguchi | |
| 2019/0182322 | A1* | 6/2019 | Kumar | .................... G06F 3/067 |

(Continued)

FOREIGN PATENT DOCUMENTS

WO 2004061590 A2 7/2004

*Primary Examiner* — Hosain T Alam
*Assistant Examiner* — Saba Ahmed
(74) *Attorney, Agent, or Firm* — CANTOR COLBURN LLP; Dan Housley

(57) ABSTRACT

Technology for storing legal hold data in the cloud (for example, in containers), where the source of the data stored in the cloud is independent backup copy(ies) that are maintained by an enterprise subject to a legal hold order. Changing the legal hold data as it is stored in the set of backup copy(ies) in a manner will not change the legal hold data as it is stored in the cloud. Mechanism may also be provided for auditing chain of custody and authenticating parties who request legal hold data to be delivered from cloud storage.

18 Claims, 7 Drawing Sheets

(56) References Cited

U.S. PATENT DOCUMENTS

2019/0304041 A1   10/2019  Raphael
2020/0192899 A1*  6/2020  Joshi ................. G06F 16/24552
2020/0310917 A1* 10/2020  Tkachev ............. G06F 11/1451

* cited by examiner

STORING LEGAL HOLD DATA IN CLOUD DATA STORAGE UNITS

BACKGROUND

It is known that a "legal hold" may be placed on documents stored as computer files in cloud storage and/or more traditional types of computer storage. For example, US published patent application 2014/0012767 ("Schmidt") discloses as follows: "A computer-implemented method for managing a legal hold on cloud documents includes: implementing, on a cloud platform configured to store documents and perform one or more services for respective tenants, a legal-hold framework; receiving legal-hold information in the legal-hold framework, the legal-hold information specifying at least one document, indicating a legal hold applicable to modification or deletion of the document, and identifying a legal action; and in response to receiving the legal-hold information, updating a legal-hold index with an identifier for the document and updating legal-hold metadata with the identity of the legal action."

SUMMARY

According to an aspect of the present invention, there is a method, computer program product and/or system, for use with an enterprise computer system including a set of primary copy(ies) of data of the enterprise and a set of backup copy(ies) of data of the enterprise, that performs the following operations (not necessarily in the following order): (i) receiving information indicative of an identity of legal hold data, which is enterprise data that has been subject to a legal hold request, and where the information includes a plurality of search criteria; (ii) determining the legal hold data from the set of backup copy(ies) stored on a backup server in the enterprise computer system, where the legal hold data is data corresponding to one or more of the plurality of search criteria; (iii) copying the legal hold data from the set of backup copy(ies) collectively into a plurality of cloud data storage units suitable for temporary storage in a cloud computer system; and (iv) storing the plurality of cloud data storage units in the cloud computer system, where the copied legal hold data is retained for the duration of the legal hold request.

DETAILED DESCRIPTION

Figure 1:
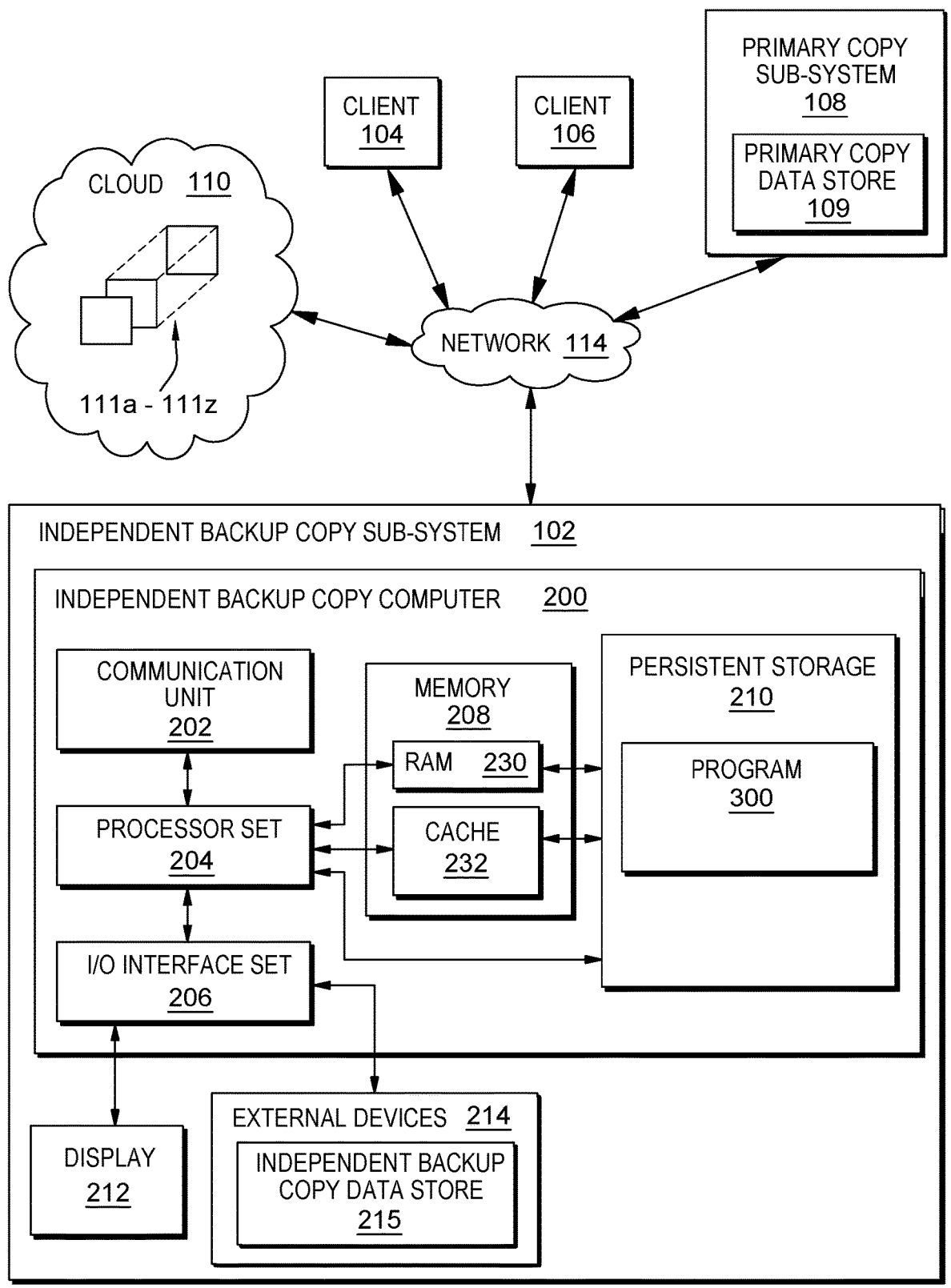
FIG. 1 is a block diagram of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 represents a networked computers system that serves as a hardware and software environment for use with various embodiments of the present invention. The networked computers system of FIG. 1 includes:

Independent backup copy subsystem 102 (sometimes herein referred to, more simply, as subsystem 102); client subsystem 104; client subsystem 106; primary copy subsystem 108; primary copy data store 109; communication network 114; and cloud 110. Independent backup copy subsystem 102 includes: independent backup copy computer 200; communication unit 202; processor set 204; input/output (I/O) interface set 206; memory 208; persistent storage 210; display 212; external device(s) 214; independent backup copy data store 215; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
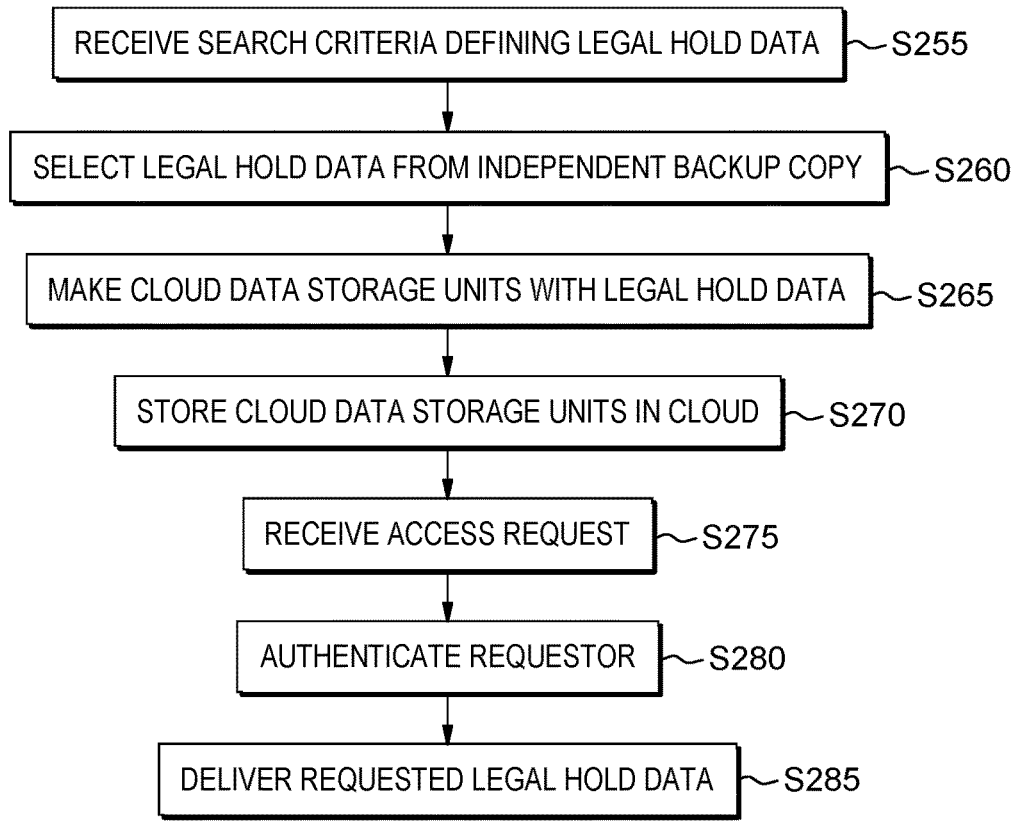
FIG. 2 is a flowchart showing a first embodiment method performed, at least in part, by the first embodiment system.
Figure 3:
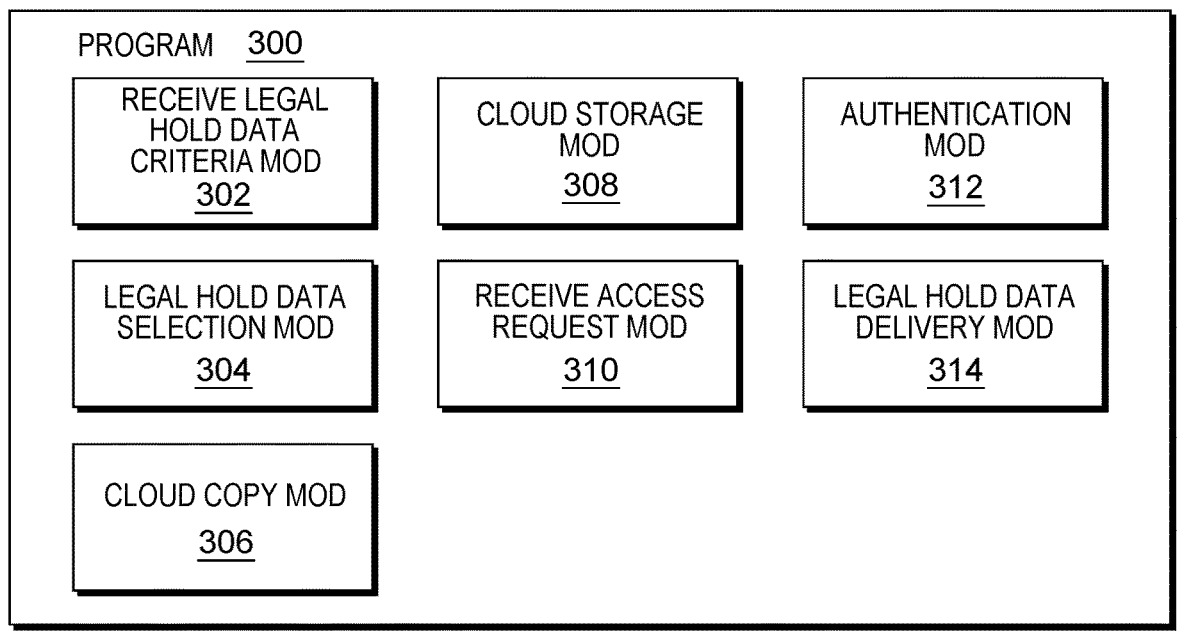
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Before the method of flowchart 250 begins, and continuing on an ongoing basis, an enterprise computer system, which in this example is made up of independent backup copy subsystem 102, client subsystem 104, client subsystem 106, and primary copy subsystem 108, operates as follows: (i) a primary copy of the enterprise data is made and stored in primary copy data store 109 of primary copy subsystem 108; (ii) this data is intermittently backed up (in this example, once per hour) in independent backup copy data store 215 of external storage device set 214 of independent backup copy subsystem 102; and (iii) a legal hold data order is entered by a court of competent jurisdiction which orders a legal hold on all enterprise data that meet the following search criteria: all email documents that mention the name "Jane Doe". The method of flowchart 250 implements this legal hold order and allows access to the legal hold data by properly authorized and authenticated users.

Processing of the method of flowchart 250 begins at operation S255, where receive legal hold data criteria module ("mod") 302 receives, from client subsystem 104 and through communication network 114, information indicative of the legal hold data which is subject to the legal hold mentioned in the previous paragraph. In this example, the identity of legal hold data is all email documents that mention the name "Jane Doe." This legal hold data is defined by two search criteria: (i) the file type is files that represent emails; and (ii) the name(s) type criteria is the name "Jane Doe". Alternatively, or additionally, other types of search criteria could be used, such as: date delimiting type criteria, project name delimiting type criteria, geographic delimiting type criteria, corporate entity name delimiting type criteria and/or any type of search criteria now known or to be developed in the future.

Processing proceeds to operation S260, where legal hold data selection mod 304 determines the legal hold data, meeting the search criteria, that is stored in independent backup copy data store 215.

Processing proceeds to operation S265, where cloud copy mod 306 copies the legal hold data identified in the previous operation to a set of containers (containers 111a to 111z), which are cloud data storage units suitable for temporary storage in cloud computer system 110. In this example, the containers are Docker style containers. Alternatively, the cloud data storage unit can be any storage unit, now known or to be developed in the future, that is suitable for storage in a cloud. In this example, when the legal hold data is copied into the set of containers, it is encrypted for security reasons.

Processing proceeds to operation S270, where cloud storage mod 308 stores containers 111a to 111z in cloud 110 in a manner such that they can only be accessed by properly authorized and authenticated requestors. The legal hold data is retained in the cloud for the duration of the legal hold request.

Processing proceeds to operation S275, where receive access request mod 310 receives a legal hold data access request, from a requestor and through client subsystem 106 and communication network 114. In this example, this request requests access to any of the legal hold data that is dated 6 Mar. 2020.

Processing proceeds to operation S280, where authentication mod 312 determines that the requestor is authorized to access the requested legal hold data.

Figure 4:
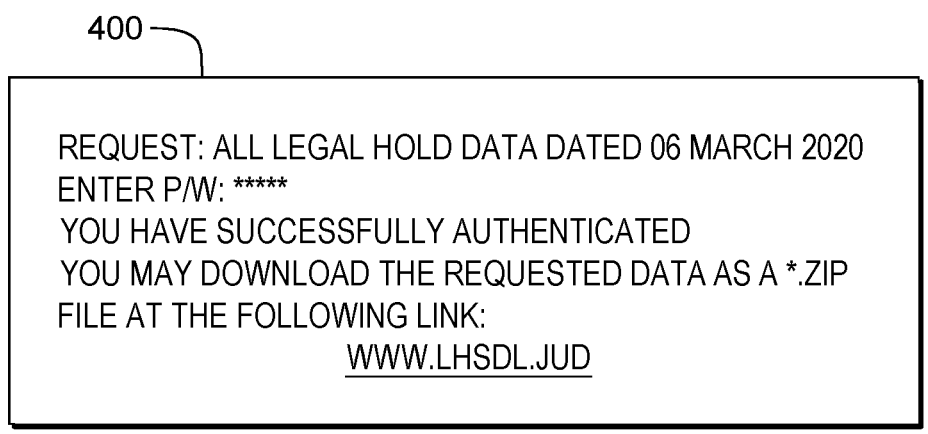
FIG. 4 is a screenshot view generated by the first embodiment system.

Processing proceeds to operation S285, where legal hold data delivery mod 314: (i) retrieves the requested data from containers 111a to 111z that are stored in the cloud; (ii) decrypts the requested legal hold data; and (iii) delivers the requested legal hold data to the requestor at client subsystem 106 in a manner such that it is available only for a limited secure download. (See screen shot 400 in FIG. 4.)

III. FURTHER COMMENTS AND/OR EMBODIMENTS

Some embodiments of the present invention recognize the following facts, potential problems and/or potential areas for improvement with respect to the current state of the art: (i) businesses are required to lower cost, complexity, and risk in regard to disseminating regulatory data for legal hold events; (ii) each year multiple legal matters require employees to hold, and rely on IT (information technology) to preserve data, restore correct data to media to distribute for legal holds; (iii) reliance on employees to manage data end-to-end legal data distribution often is insufficient or un-auditable; (iv) usually regulatory data is restored to some type of physical media, which can be very costly and time-consuming in migrating the required amounts of archived data; (v) often media shipments are compromised, where media data is lost in transit or falls into wrong hands; and/or (vi) this could cause data breaches and risk to legal matters and or IT organizations.

Some embodiments of the present invention may include one, or more, of the following operations, features, characteristics and/or advantages: (i) data re-use transformation and repackaging technology, which is implemented using a secure automated Backup/Restore server legal data copy solution which integrates with Cloud APIs (application program interfaces) to enable on-demand metadata search capability, allowing critical data retrieval to be performed efficiently, with regulatory compliance and/or with enforcement of an auditing trail; (ii) storage of legal hold data that meets regulatory compliance requirements; and/or (iii) storage of legal hold data that provides risk management for distributing legal data to required parties.

Some embodiments of the present invention may include one, or more, of the following operations, features, characteristics and/or advantages: (i) data re-use where existing data is repackaged and transformed to provide legal data requirements in the cloud; (ii) backup/restore system integration with cloud environment APIs can perform advanced search on metadata for associated with structured and/or unstructured data (for example, email, statements, confirmations, external customer correspondence, office and business documents, scanned Images, media files video surveillance) contained on Cloud Storage; and/or (iii) backup/restore system either on-premise or located in a cloud environment enables legal to place holds directly on the archived data and provides legal data quickly without long restore processes.

A method according to an embodiment of the present invention uses cloud API integration and includes the following operations (not necessarily in the following order): (i) the Backup/Restore Server looks up data from its catalog; (ii) calculates required storage to state data; (iii) spins up a temporary cloud storage container; (iv) copies required legal data; (v) the legal data is collected and encrypted at rest on the temporary stating cloud storage to reduce risk and impact on IT (information technology); (vi) upon legal request for data, a link is provided to the lawyers to download the data; (vii) once the data is downloaded by intended user the data is retained for duration of legal hold, protected, and then deleted; and (viii) the temporary cloud storage is deprovisioned using cloud native APIs once the data is accessed.

A method for backup of legal data for discovery, going beyond retention and repackaging for consumption, includes the following operations (not necessarily in the following order): (i) request sent to backup/restore system to put data on indefinite legal hold; (ii) backup system disables ability of data to expire; (iii) criteria of data required provided from legal discovery; (iv) request stored data; (v) backup/restore system launches automation to dynamically provision cloud storage using APIs to calculate how much storage is required based on data size and spins enough cloud storage disk for legal hold data; (vi) backup/restore server launches automation and copies data to Cloud Storage staging environment and encrypts data at rest; (vii) download link generated to send to lawyers, upon access of the link; (viii) provides audit trail, logs, IP addresses, two (2) factor authentications, for accessible data; (ix) once data is downloaded the link expires; (x) data is retained on cloud storage staging area for time of legal hold; (xi) cloud API for consumption based billing put in place; and/or (xii) legal hold released cloud storage APIs triggered to deprovision storage.

Figure 5:
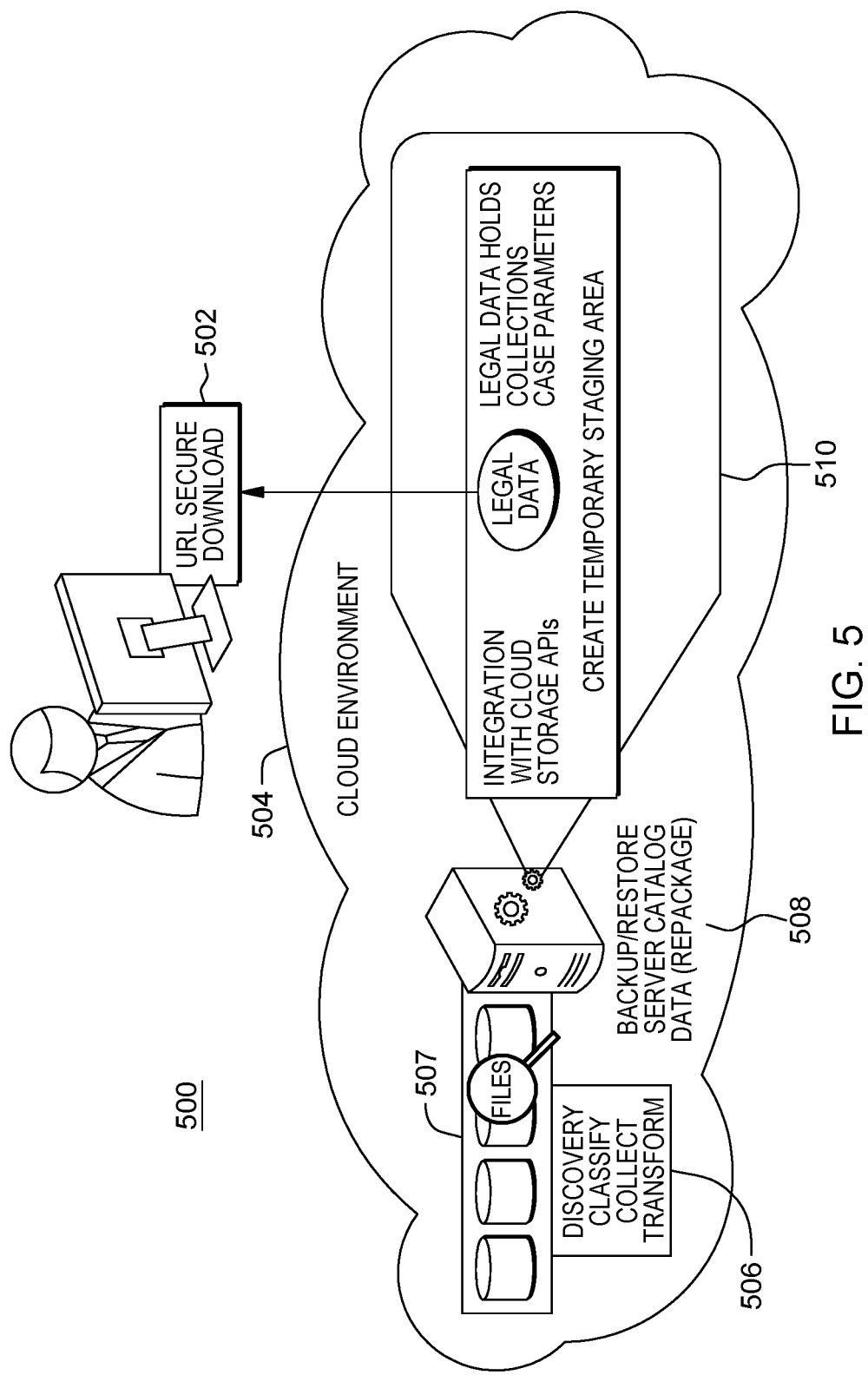
FIG. 5 is a block diagram of a second embodiment of a system according to an embodiment of the present invention.

As shown in FIG. 5, system 500 performs on-demand repackaging of regulated Data for reuse of data, in a cloud to cloud manner. System 500 includes: URL secure download module 502; cloud environment 504; discovery classify collect transform module 506; files 507; backup/restore server catalog data (repackage) module 508; and temporary staging area 510.

Figure 6:
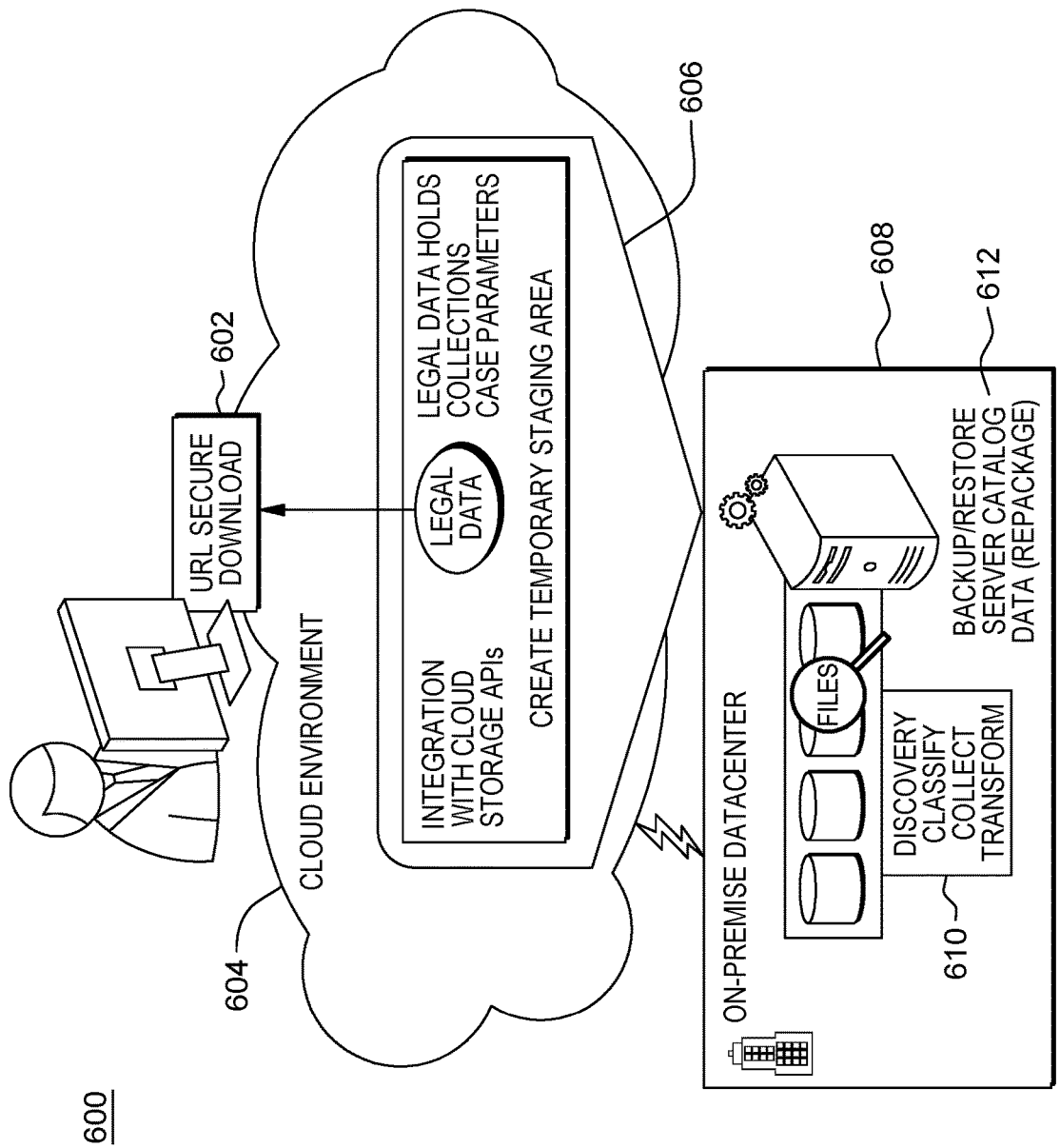
FIG. 6 is a block diagram of a third embodiment of a system according to an embodiment of the present invention.

As shown in FIG. 6, system 600 performs on-demand repackaging of regulated data for reuse of data in an on-premise to cloud manner. System 600 includes: URL secure download module 602; cloud environment 604; temporary staging area 606; on premise data center 608; discovery classify collect transform module 610; and backup/restore server catalog data (repackage) 612.

A method according to an embodiment of the present invention includes the following operations (not necessarily in the following order): (i) receiving a legal hold on archived data; (ii) receiving a request for legal data, where criteria of data requested is determined by legal process, and where cloud environment APIs perform advanced search on meta data for required structured and unstructured data; (iii) launching automation to dynamically provision cloud storage to calculate how much storage is required based on requested legal data size; (iv) copy data to cloud storage staging environment (temporary cloud storage container)

where it is retained for legal hold period and encrypted; (v) generate link which upon access provides audit trail, logs, IP addresses, and two factor authentication for requested legal data; and (vi) upon release of legal hold, deprovisioning cloud storage.

Some embodiments of the present invention may include one, or more, of the following operations, features, characteristics and/or advantages: (i) data re-use transformation and repackaging, implemented using a secure automated backup/restore server and/or replication appliance; (ii) a legal data copy solution which integrates with IaaS (Internet as a service) REST APIs to enable on-demand repackaging and data transformation capability, allowing for critical data retrieval to be performed securely and efficiently; (iii) a broader end-to-end legal data repackaging/re-use automation system which transforms copy data from backup/restore servers and or replication appliances upon legal request; (iv) provides integrated automation for backup/restore systems, and data replication appliances which catalog data and can read data sets at the file level; (v) this invention disclosure launches automated auto repackaging workflows on backup and or replication appliances on-demand to access catalogue data sets; (vi) auto transformation workflows transform/repackage legal data for re-use; (vii) the repackaged data is staged within cloud or on-premise environments utilizing IaaS provisioning REST API to dynamically stage repackaged data; (viii) repackaged data is encrypted at rest; and/or (ix) a secure link is provided for download upon legal request.

Some embodiments of the present invention may include one, or more, of the following operations, features, characteristics and/or advantages: (i) legal hold data storage system that takes the payload data and makes it accessible to authorized users; (ii) makes legal hold data accessible to authorized users in a way that includes authentication of the user and auditing of their access; (iii) deprovisions containers (or other virtual computing environments) bay invalidating a link and removing the data payload of the container from cloud storage; and/or (iv) leverages secure delete/secure wipe technologies now existing or to be developed in the future. It is noted that delete/secure wipe technologies refer to deletion that overwrites data multiple times and/or with random or patterned data.

Some embodiments of the present invention may include one, or more, of the following operations, features, characteristics and/or advantages: (i) automates certain operations to remove remove human intervention from the process of identifying, indefinitely retaining, transforming, packaging and delivery of legal hold data; (ii) removes security exposure (that is, access to data in human readable form) from the process of identifying, indefinitely retaining, transforming, packaging and delivery of legal hold data; (iii) uses an unmodified running production backup system as the source of data for legal hold; (iv) ensures that a service provider (for example, a third party that is not generating the legal hold data in the first place) does not have access of opportunity to the client's data (with the client being the party that generates the legal hold data); (v) automates data restoration so that manual data restoration is reduced or eliminated; (vi) automates secure storage (for example, data-at-rest encryption is only enforced by policy) so that human intervention is minimized or eliminated; and/or (vii) automates packaging and delivery of legal hold data stored in the cloud.

Under at least some of the currently conventional technology for storing legal data in a cloud, when a customer requests the use of backup data for legal hold, the backup system is modified to prevent all data (system or company-wide) from being purged on expiry. This adds cost and complexity, and can lead to a system failure due to resources starvation.

Some embodiments of the present invention may include one, or more, of the following operations, features, characteristics and/or advantages: (i) extracting legal hold data from unmodified production backup services; (ii) outputting legal hold data in a human consumable format; and/or (iii) performing legal hold data format conversion as necessary to an encrypted object storage bucket independent of the backup system.

Some embodiments of the present invention may include one, or more, of the following operations, features, characteristics and/or advantages: (i) on-demand packaging of legal hold data from an encrypted storage bucket to an encrypted concatenated file; (ii) generating a secured one-time access link automatically; and/or (iii) monitoring for access and deleting the concatenated file once accessed.

Under certain currently conventional technology, legal hold data originates from production servers (file servers, databases, etc.) or from restored data from backups. All backup data expiry (purging data older than retention policy) is suspended indefinitely. At a later time, it may be requested that old data from select servers be restored, and this data restored from select servers is manually copied to physical media and sent to the party that generated the legal hold data (for example, a company being scrutinized for antitrust purposes). Some embodiments of the present invention automate this restoration to avoid the need for manual restoration.

As may have been mentioned above, some embodiments of the present invention perform data format conversion as necessary to an encrypted object storage bucket.

To further discuss the idea of an "independent backup system" for legal hold data, by their nature, backup systems purge data every day as it ages beyond the retention period. New data replaces that, and so a normal system adds slightly more data than it purges, meaning that the data repository grows at a relatively slow (and predictable) pace. When an indefinite legal hold is placed on backup data, it grows exponentially because no old data is being purged. This represents a danger to the stability of the backup system as it forced to consume resources beyond the design of the system. A method according to an embodiment of the present invention: (i) creates such a lock; (ii) checks all data in the backup repository and copies files within the criteria from the backup system into an encrypted object storage "bucket"; (iii) the expiry lock is released; and (iv) the system iteratively scans new data as it appears, copying relevant data to aforementioned "bucket." The "bucket" is retained indefinitely as per the hold request, but the backup system continues to process (and purge) data as normal.

Some embodiments of the present invention may include one, or more, of the following operations, features, characteristics and/or advantages: (i) does not require data or metadata streams to be processed; (ii) uses queries and data access to determine in-scope material, which typically requires significantly less processing and (targeted) data transfer; (iii) can find legal hold data in both structured and unstructured data sources, and transfers copies to an unstructured repository; (iv) for the sequestration of data and the secure transmission to a purposefully limited receiver (via push); (v) discriminates between in-scope and out-of-scope data prior to ingest, by scanning the content on the source system (backup server); (vi) uses an independent backup system for legal hold data to access data which is stored on legacy systems, and are not limited to applications which dwell in or use cloud services/APIs; (vii) performs direct action on the data (such as copying it off of its source system); and/or (viii) uses classifications for sequestration or further processing by another non-related system.

Some embodiments of the present invention may include one, or more, of the following operations, features, characteristics and/or advantages: (i) uses an existing backup data repository as the source of data, scanning content and creating a secondary copy using a different secure storage method, when search criteria is met; (ii) selectively ingests data for retention based on files matching search criteria as scanned/searched from the backup repository; (iii) transmission of data is based on a limited set of recipients determined by the client's legal request; (iv) uses an existing backup data repository as the source of data, scanning content for multiple criteria (using the backup server's spare resources) and creating a secondary copy using a different secure storage method when search criteria is met; (v) collates in-scope data into a secure (encrypted) cloud storage (unstructured) bucket until which time it is requested to be transmitted; (vi) data is processed as required into human-readable format, concatenated and made available as a secure download to a limited set of recipients; (vii) uses an existing backup data repository as the source of legal hold data, scanning content for multiple criteria in-situ (using the backup server's spare resources) and creating a secondary copy of the identified legal hold data using a different secure storage method only when legal hold search criteria is met; (viii) collates in-scope legal hold data into a secure (encrypted) cloud storage (unstructured) bucket until which time the legal hold data is requested to be transmitted; (ix) the legal hold data is then processed as required into human-readable format, concatenated and made available as a one-time secure, and auditable download to a limited set of recipients using a method to ensure chain-of-custody; (x) performs an automated process by which the chain of custody is preserved (without user-level access to the data); and/or (xi) designed to eliminate the possibility of modification or elimination of the legal hold data once the legal hold requirement has been enabled.

Figure 7:
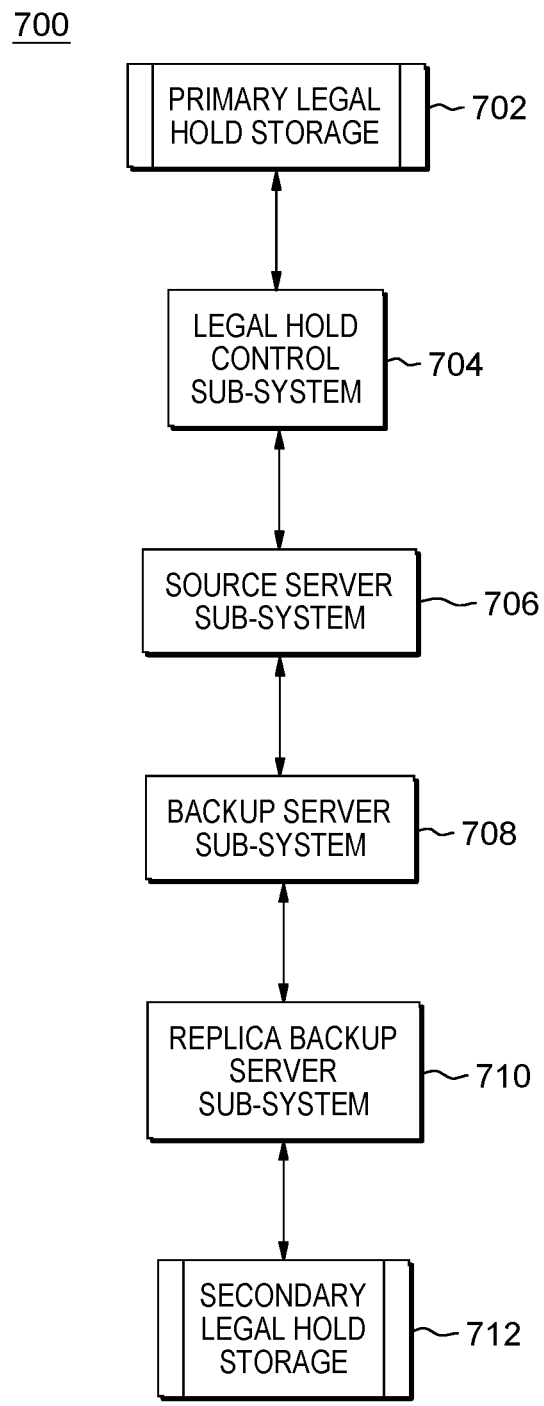
FIG. 7 is a block diagram of a fourth embodiment of a system according to the present invention.

As shown in FIG. 7, system 700 includes: primary legal hold storage 702; legal hold control subsystem 704; source server subsystem 706; backup server subsystem 708; replica backup server subsystem 710; and secondary legal hold storage 712. With regard to source server subsystem 706, it is noted that: (i) in most scenarios, backup functions are required; and (ii) some embodiments may require that the source server communicates by streaming a separate copy of the files to a legal hold system; and (iii) this kind of streaming requires host processor cycles, memory and/or network bandwidth. With regard to backup server subsystem 708, it is noted that: (i) due to the ubiquity of data backup, some embodiments may leverage single-source in order to implement the legal hold independently of the source servers; and this also reduces the attack surface because no attack can be made upon the source servers. With regard to replica backup server 710, it is noted that system 700 uses the spare resources of the replica, which does not consume significant resources outside of a disaster recover (DR) event.

Figure 8:
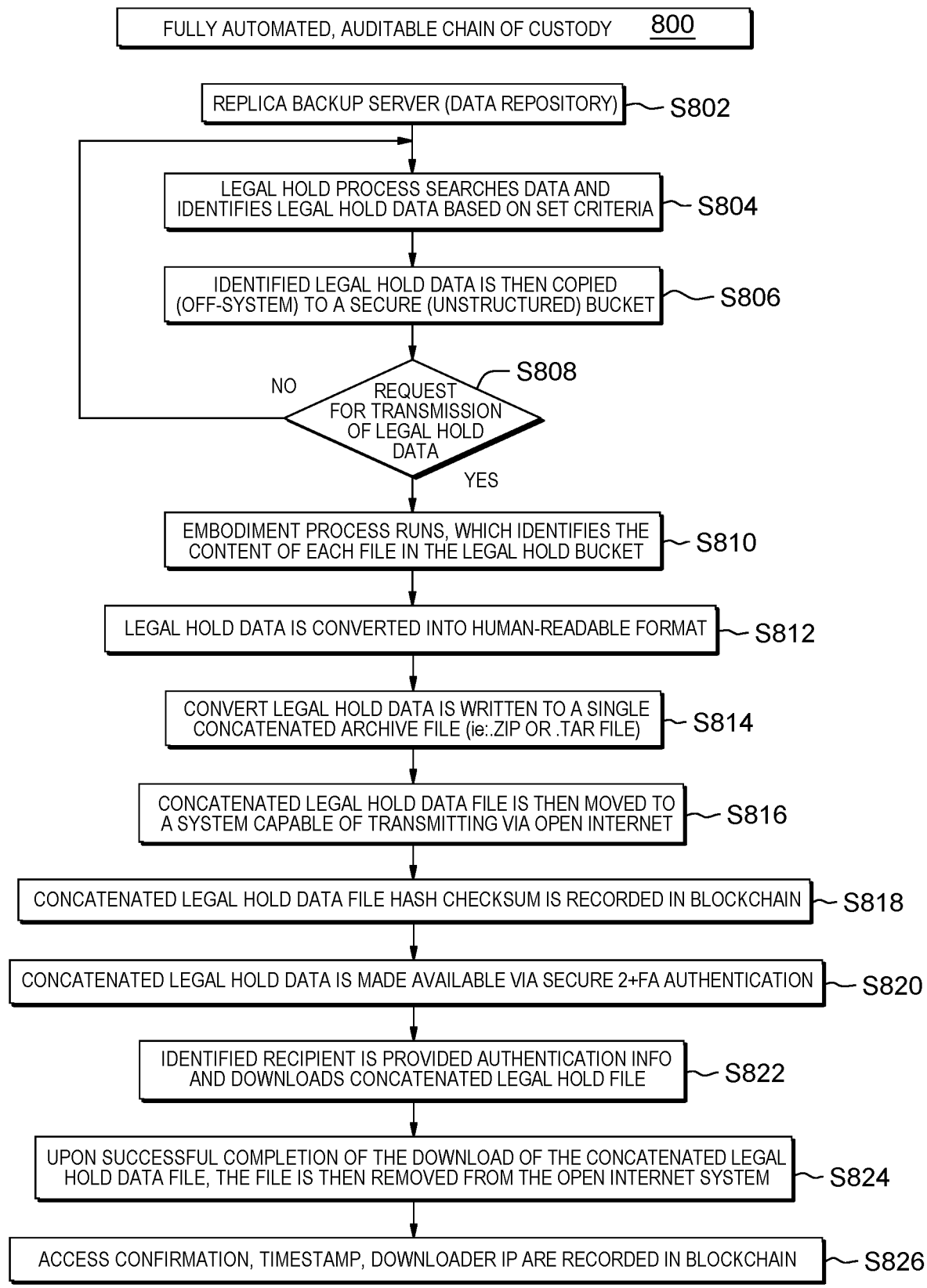
FIG. 8 is a flowchart showing a second embodiment method.

As shown in FIG. 8, there is an embodiment of a method for fully automated auditable chain of custody 800. Method 800 includes the following operations (with order among and between the operations shown by arrows in FIG. 8): S802; S804; S806; S808; S810; S812; S814; S816; S818; S820; S822; S824; and S826. With respect to S806: (i) access to the legal hold data bucket is only via complex (>2048 bit) authentication key, and source IP validation; and (ii) no user-based access method exists.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method for use with an enterprise computer system including a set of primary copies of data of the enterprise and a set of backup copies of data of the enterprise, the computer implemented method comprising:

receiving, at an independent backup copy computer, information indicative of an identity of legal hold data, which is enterprise data that has been subject to a legal hold request, and where the information includes a plurality of search criteria, the independent backup copy computer being separate and independent from a primary copy sub-system containing the set of primary copies of the data of the enterprise in a primary copy data store;

determining, by the independent backup copy computer, the legal hold data from the set of backup copies stored on an external backup server in an external data store and accessed by the independent backup copy computer, where the legal hold data is data corresponding to one or more of the plurality of search criteria, the external data store containing the set of backup copies being separate from the primary copy data store, and wherein the independent backup copy computer disables ability of the data to expire;

processing the set of primary copies of data into a human-readable format, wherein the processing includes concatenating the set of primary copies of data and making the set of primary copies of data available to a limited set of recipients;

copying and storing the set of primary copies in the primary data store prior to entering a legal hold data order which orders a legal hold on the primary data responsive to a predetermined search criteria;

copying and encrypting by the independent backup copy computer, the legal hold data from the set of backup copies collectively into a plurality of cloud data storage units suitable for temporary storage in a cloud computer system, the independent backup copy computer being part of the enterprise computer system and independent from the cloud computer system;

performing an on-demand packaging of the legal hold data from an encrypted storage bucket to an encrypted concatenated file and automatically generating a secured one-time access link;

monitoring access to the on-demand packaging and deleting the encrypted concatenated file once the on-demand packaging has been accessed; and forwarding, by the independent backup copy computer, the plurality of cloud data storage units to the cloud computer system for storing in one or more containers, where the copied, encrypted legal hold data is retained for the duration of the legal hold request.

2. The computer implemented method of claim 1 wherein the plurality of cloud data storage units are respectively in the form of the containers.

3. The computer implemented method of claim 1 wherein the search criteria include search criteria selected from the group consisting of:

individual name delimiting type criteria, date delimiting type criteria, file type delimiting type criteria, project name delimiting type criteria, geographic delimiting type criteria and corporate entity name delimiting type criteria.

4. The computer implemented method of claim 1 further comprising:

changing the legal hold data as it is stored in the set of backup copies in a manner that does not change the legal hold data as it is stored in the plurality of cloud data storage units.

5. The computer implemented method of claim 1 further comprising:

receiving a first request, made by a first requestor, for access requested legal hold data, which requested legal hold data is at least a portion of the legal hold data;

determining that the first requestor is authorized to access the requested legal hold data; and responsive to the determination that the first requestor is authorized to access the requested legal hold data:
obtaining the requested legal hold data from the plurality of cloud data storage units,
converting the requested legal hold data into a set of requested legal hold data files suitable for delivery over a communication network and access by a human user, and
sending the requested legal hold data files to the first requestor over a communication network, where the requested legal hold data files are available only for a limited secure download.

6. The computer implemented method of claim 1 further comprising:

providing an auditable chain of custody for at least of portion of the legal hold data.

7. The computer implemented method of claim 1 further comprising:

receiving a request, from a requestor and over a communication network, for at least a portion of the legal hold data stored in the plurality of cloud data storage units in the cloud computer system;
authenticating the requestor; and
responsive to authenticating the requestor, sending over the communication network and to the requestor, the at least a portion of the legal hold data.

8. The computer implemented method of claim 1 further comprising:

removing a file from the internet after a download of the file.

9. A computer program product comprising:

a non-transitory computer-readable storage medium; and
computer code stored on the non-transitory computer-readable storage medium, with the computer code including data and instructions for causing a processor set to perform at least the following operations:

receiving, at an independent backup copy computer, information indicative of an identity of legal hold data, which is enterprise data that has been subject to a legal hold request, and where the information includes a plurality of search criteria, the independent backup copy computer being separate and independent from a primary copy sub-system containing a set of primary copies of the data of the enterprise in a primary copy data store;

determining, by the independent backup copy computer, the legal hold data from the set of backup copies stored on an external backup server in an external data store and accessed by the independent backup copy computer, where the legal hold data is data corresponding to one or more of the plurality of search criteria, the external data store containing the set of backup copies being separate from the primary copy data store, and wherein the independent backup copy computer disables ability of the data to expire;

processing the set of primary copies of data into a human-readable format, wherein the processing includes concatenating the set of primary copies of data and making the set of primary copies of data available to a limited set of recipients;

copying and storing the set of primary copies in the primary data store prior to entering a legal hold data order which orders a legal hold on the primary data responsive to a predetermined search criteria;

copying and encrypting by the independent backup copy computer, the legal hold data from the set of backup copies collectively into a plurality of cloud data storage units suitable for temporary storage in a cloud computer system, the independent backup copy computer being part of the enterprise computer system and independent from the cloud computer system;

performing an on-demand packaging of the legal hold data from an encrypted storage bucket to an encrypted concatenated file and automatically generating a secured one-time access link;

monitoring access to the on-demand packaging and deleting the encrypted concatenated file once the on-demand packaging has been accessed; and forwarding, by the independent backup copy computer, the plurality of cloud data storage units to the cloud computer system for storing in one or more containers, where the copied, encrypted legal hold data is retained for the duration of the legal hold request.

10. The computer program product of claim 9 wherein the plurality of cloud data storage units are respectively in the form of containers.

11. The computer program product of claim 9 wherein the search criteria include search criteria selected from the group consisting of:
   individual name delimiting type criteria, date delimiting type criteria, file type delimiting type criteria, project name delimiting type criteria, geographic delimiting type criteria and corporate entity name delimiting type criteria.

12. The computer program product of claim 9 wherein the computer code further includes data and instructions for causing a processor to further perform at least the following operation:
   changing the legal hold data as it is stored in the set of backup copies in a manner that does not change the legal hold data as it is stored in the plurality of cloud data storage units.

13. The computer program product of claim 9 wherein the computer code further includes data and instructions for causing a processor to perform at least the following operations:
   receiving a first request, made by a first requestor, for access requested legal hold data, which requested legal hold data is at least a portion of the legal hold data;
   determining that the first requestor is authorized to access the requested legal hold data; and
   responsive to the determination that the first requestor is authorized to access the requested legal hold data:
      obtaining the requested legal hold data from the plurality of cloud data storage units,
      converting the requested legal hold data into a set of requested legal hold data files suitable for delivery over a communication network and access by a human user, and
      sending the requested legal hold data files to the first requestor over a communication network, where the requested legal hold data files are available only for a limited secure download.

14. The computer program product of claim 9 wherein the computer code further includes data and instructions for causing a processor to further perform at least the following operation:
   providing an auditable chain of custody for at least of portion of the legal hold data.

15. The computer program product of claim 9 wherein the computer code further includes data and instructions for causing a processor to further perform at least the following operations:
   receiving a request, from a requestor and over a communication network, for at least a portion of the legal hold data stored in the plurality of cloud data storage units in the cloud computer system;
   authenticating the requestor; and
   responsive to authenticating the requestor, sending over the communication network and to the requestor, the at least a portion of the legal hold data.

16. The computer program product of claim 9 wherein the computer code further includes data and instructions for causing a processor to further perform at least the following operation:
   removing a file from the internet after a download of the file.

17. A computer system comprising:
   a processor set;
   a set of storage devices; and
   computer code stored on the set of storage devices, with the computer code including data and instructions for causing the processor set to perform at least the following operations:
      receiving, at an independent backup copy computer, information indicative of an identity of legal hold data, which is enterprise data that has been subject to a legal hold request, and where the information includes a plurality of search criteria, the independent backup copy computer being separate and independent from a primary copy sub-system containing a set of primary copies of the data of the enterprise in a primary copy data store;
      determining, by the independent backup copy computer, the legal hold data from the set of backup copies stored on an external backup server in an external data store and accessed by the independent backup copy computer, where the legal hold data is data corresponding to one or more of the plurality of search criteria, the external data store containing the set of backup copies being separate from the primary copy data store, and wherein the independent backup copy computer disables ability of the data to expire;
      processing the set of primary copies of data into a human-readable format, wherein the processing includes concatenating the set of primary copies of data and making the set of primary copies of data available to a limited set of recipients;
      copying and storing the set of primary copies in the primary data store prior to entering a legal hold data order which orders a legal hold on the primary data responsive to a predetermined search criteria;
      copying and encrypting by the independent backup copy computer, the legal hold data from the set of backup copies collectively into a plurality of cloud data storage units suitable for temporary storage in a cloud computer system, the independent backup copy computer being part of the enterprise computer system and independent from the cloud computer system;
      performing an on-demand packaging of the legal hold data from an encrypted storage bucket to an encrypted concatenated file and automatically generating a secured one-time access link;
      monitoring access to the on-demand packaging and deleting the encrypted concatenated file once the on-demand packaging has been accessed; and
      forwarding, by the independent backup copy computer, the plurality of cloud data storage units to the cloud computer system for storing in one or more containers, where the copied, encrypted legal hold data is retained for the duration of the legal hold request.

18. The computer system of claim 17 wherein the computer code further includes data and instructions for causing a processor to further perform at least the following operation:
   changing the legal hold data as it is stored in the set of backup copies in a manner that does not change the legal hold data as it is stored in the plurality of cloud data storage units.

* * * * *